Patented July 22, 1941

2,249,903

UNITED STATES PATENT OFFICE 2,249,903

STABLE AQUEOUS SOLUTION OF ASCORBIC ACID

Carl Ludwig Lautenschlager and Fritz Lindner, Frankfort-on-the-Main, Germany, assignors to Winthrop Chemical Company, Inc., New York, N. Y., a corporation of New York No Drawing. Application January 23, 1936, Serial No. 60,544. In Germany January 26, 1935

6 Claims. (Cl. 167—81)

The present invention relates to stable aqueous solutions of ascorbic acids, more particularly to solutions of levo-ascorbic acid, known as vitamin C, said solutions being capable of being injected, and to a process of preparing them.

As is known the ascorbic acids, especially the levo-ascorbic acid itself, are frequently applied in medicine in the form of preparations to be administered per os but there is no process for the preparation of stable aqueous solutions of the ascorbic acids capable of being injected and used for the parenteral therapy. This is due to the fact that the compounds named cannot be injected at all or only with difficulty on account of their acid properties and that hitherto attempts had not been made to obtain solutions of the ascorbic acid salts because statements made in literature show that the acid soon decomposes in the alkaline range.

Now we have found that supplies of stable aqueous solutions of the ascorbic acids and especially of the levo-ascorbic acid can be obtained by mixing solutions of the levo-ascorbic acid with basic substances which reduce the acid degree of the solution and filling the solutions thus obtained with the aid of inert gases, while excluding oxygen, into ampoules or other containers capable of being hermetically sealed. As basic agents there may, for instance, be used sodium carbonate, caustic soda solution, calcium hydroxide, magnesium hydroxide, ammonia, furthermore triethanolamine, amino-ethanol or any other organic bases; these agents are used in such an amount that the acid dissolved is partly or completely neutralized. As inert gases there may be applied nitrogen, hydrogen, carbonic acid and the like. The solutions may be kept sterile by sterilizing additions or by the sterilization of the ampoules which are free from additions and they may be injected without causing irritation.

The solutions prepared according to this process are stable for a very long time if they are stored with exclusion of oxygen; the ascorbic acid could, for instance, be reobtained in an unaltered purity from a 9 months' old solution.

The following examples serve to illustrate the invention, but they are not intended to limit it thereto:

1. 2.5 grams of levo-ascorbic acid are dissolved in water; the whole is adjusted to a hydrogen ion concentration of about 4.0 by the addition of 3.5 cc. of N-caustic soda solution. The solution is made up to 100 cc. and charged into ampoules in an atmosphere of carbonic acid; the ampoules are sealed in the carbonic acid current and sterilized for 10 minutes in flowing steam.

2. 2.5 grams of levo-ascorbic acid are dissolved in water; the solution is adjusted to a hydrogen ion concentration of about 6.5 by the addition of 16 cc. of N-caustic soda solution or the corresponding amount of sodium carbonate solution and is made up to 100 cc. The solution is then charged into ampoules in an atmosphere of nitrogen or hydrogen and sterilized as indicated in Example 1.

3. 2.5 grams of levo-ascorbic acid are dissolved in water, neutralized by addition of ethanol amine and made up to 100 cc. By the addition of 10 mg. of the sodium salt of 2-ethyl-mercurymercaptobenzoxazole-5-carboxylic acid the solution is sterilized and filled into ampoules in a nitrogen atmosphere and sealed.

We claim:

1. An anti-scorbutic solution adaptable for hypodermical administration containing an ethanol amine salt of ascorbic acid.

2. An anti-scorbutic solution adaptable for hypodermical administration containing the ethanol amine salt of ascorbic acid.

3. An anti-scorbutic solution adaptable for hypodermical administration containing the triethanol amine salt of ascorbic acid.

4. An aqueous solution containing ascorbic acid and an ethanol amine in an amount not sufficient for complete neutralization of the acid, said solution being non-stable to oxygen and stable to inert gases and having a pH value between about 4 and 6.5.

5. An aqueous solution containing ascorbic acid and ethanol amine in an amount not sufficient for complete neutralization of the acid, said solution being non-stable to oxygen and stable to inert gases and having a pH value between about 4 and 6.5.

6. An aqueous solution containing ascorbic acid and triethanol amine in an amount not sufficient for complete neutralization of the acid, said solution being non-stable to oxygen and stable to inert gases and having a pH value between about 4 and 6.5.

CARL LUDWIG LAUTENSCHLAGER.
FRITZ LINDNER.